T. A. McGILL ET AL 2,989,013

SEWING MACHINES

Filed Sept. 26, 1957

WITNESS
Nicholas Leszczak

INVENTORS.
Thomas A. McGill and
BY Kenneth W. Macdonald

Marshall J. Breen
ATTORNEY

June 20, 1961  T. A. McGILL ET AL  2,989,013
SEWING MACHINES

Filed Sept. 26, 1957  11 Sheets-Sheet 8

WITNESS
Nicholas Leszczak

INVENTORS.
Thomas A. McGill and
BY Kenneth W. Macdonald

Marshall J. Breen
ATTORNEY

INVENTORS.
Thomas A. McGill, and
Kenneth W. Macdonald.
BY
ATTORNEY

United States Patent Office 2,989,013
Patented June 20, 1961

2,989,013
SEWING MACHINES
Thomas A. McGill, Lunenburg, and Kenneth W. Macdonald, Rockland, Mass., assignors, by mesne assignments, to The Singer Manufacturing Company, Elizabeth, N.J., a corporation of New Jersey
Filed Sept. 26, 1957, Ser. No. 686,303
16 Claims. (Cl. 112—2)

This invention relates to sewing machines and, more particularly, to automatically operable mechanism associated with a sewing machine for controlling both the operation of the sewing machine and the flow of work to and from the sewing machine.

This invention has particular utility as applied to a cyclically operable sewing machine such as a button or buttonhole sewing machine. It is an object of this invention to provide a mechanism for incorporating the sewing machine operation into a sewing unit capable of a larger and more comprehensive cycle of sewing and work manipulating operations in which the stitching of any one category may be accomplished throughout a garment or a garment section in one automatic cycle of operation.

It is also an object of this invention to provide a mechanism for automatically manipulating individual garments or garment sections in a positive and accurate manner during a cycle of machine operation including a plurality of separate sewing machine operations.

The apparatus chosen to illustrate the preferred embodiment of this invention is adapted to apply automatically all of the buttonholes accurately spaced in a shirt front with the exception of the collar buttonhole which is preferably arranged to extend at right angles to the other buttonholes and is made separately.

In the making of a shirt, the buttonholes in the front are customarily stitched at that stage after the shirt front section has been cut and the front fly thereof has been hemmed. It will be appreciated that at this stage, provision must be made to insure that the shirt front will register accurately with the other sections of the shirt when they are assembled. To this end, accurate positioning and spacing of the buttonhole is of prime importance.

With the above and additional objects and advantages in view, as will hereinafter appear, this invention comprises the devices, combinations and arrangements of parts hereinafter described and illustrated in the accompanying drawings of a preferred embodiment in which:

In the embodiment of this invention illustrated in the drawings, there is used a conventional lock stitch buttonhole sewing machine 20 of the type adapted to produce straight buttonholes. The sewing machine is supported at counter height on a frame preferably in the form of a cabinet 21. Although the sewing machine is conventional, three mechanisms which form a part of the sewing machine are particularly important to understanding of the present invention; these mechanisms are the sewing machine stop motion mechanism, the buttonhole cutting mechanism, and the work clamp together with the work clamp opening mechanism.

Carried on a bracket in the cabinet 21 is an electric motor 22 which is connected by a belt 23 to drive the sewing machine. The belt 23 may engage either a pulley 24 fast on the main shaft of the sewing machine or an adjacent pulley 25 freely journaled thereon. A stop motion frame 26 pivoted on the sewing machine carries a belt shipper which serves to shift the belt from one to the other of the pulleys. In addition to the belt shipper, the stop motion frame carries a stop finger 27 which is arranged so as to be shifted into engagement with a stop cam 28 on the main shaft of the sewing machine to stop the machine when the belt is shifted to the free pulley, and to be shifted out of engagement with the stop cam when the belt is shifted to the fast pulley to start the machine. A plunger rod 29 is pivoted to the stop motion frame 26 and biased by means of a spring 30 bearing against a collar 31 on the plunger rod to urge the stop motion frame into the stopped position of the sewing machine. An external force is required to turn the stop motion frame in opposition to the spring 30 to start the sewing machine; the mechanism of this invention for applying such external force will be described later. When turned to start the sewing machine, however, the stop motion frame is held in such position by a latch device which, as is conventional in this type of sewing machine, is released automatically by the sewing machine upon completion of a buttonhole tack.

Cutting of the buttonhole in the sewing machine illustrated in the drawings is accomplished by a knife 32 which is actuated by a linkage on the sewing machine including a lever 33 which is driven by the overthrow of the stop motion frame occasioned by the engagement of the stop finger with the stop cam in bringing the sewing machine to rest. In the linkage between the lever 33 and the knife 32 there is a bell-crank latch lever 34 biased by a coil spring 35 into a position underlying a stud 36 on a knife driving lever 37 so that a complete driving connection will occur between the lever 33 and the knife. The bell crank latch lever 34 is cammed out of operative position during most of each cycle of sewing machine operation so that the knife will not cut accidentally if the machine happens to be stopped prematurely. In the normal operation of the machine, the bell-crank latch lever is released by the cam just prior to the completion of a sewing cycle so that it may be spring-returned into operative position beneath the stud 36.

Figure 1:
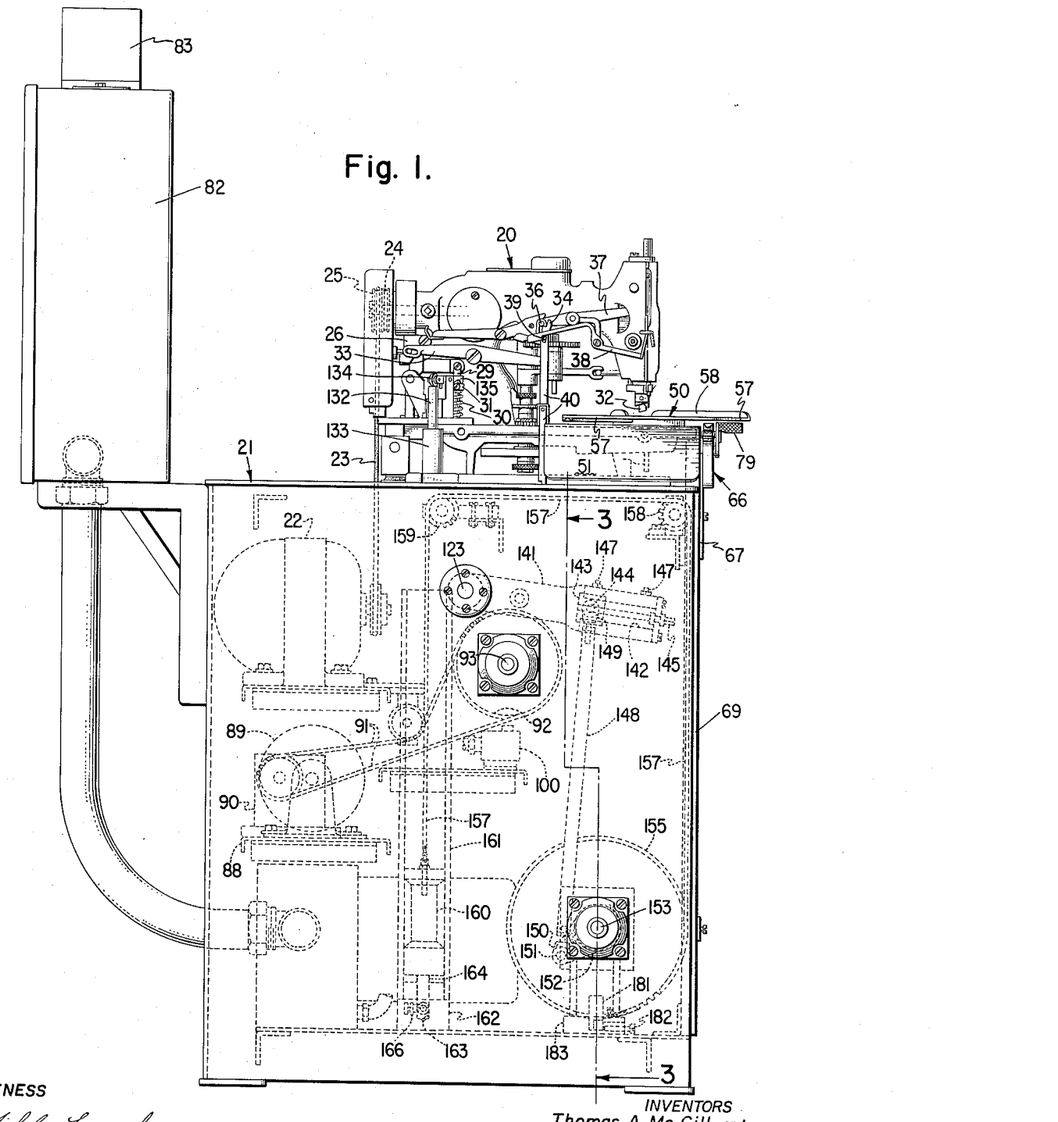
FIG. 1 represents a left side elevational view of the machine embodying this invention.
Figures 7, 8, 9:
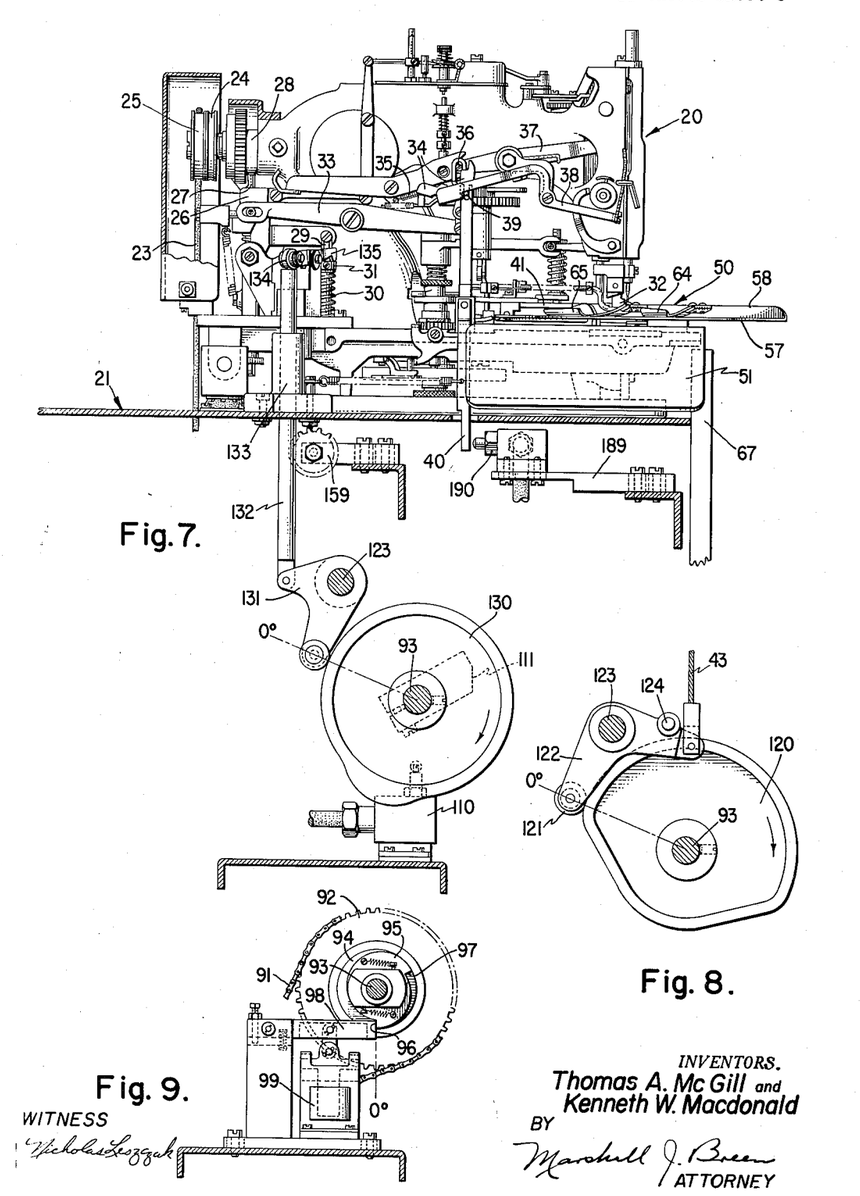
FIG. 7 is a vertical cross sectional view of the supporting and control cabinet taken substantially along line 7—7 of FIG. 3 illustrating the sewing machine starting cam and cam follower connections and including a side elevational view of the sewing machine.
FIG. 8 is a cross sectional view taken substantially along line 8—8 of FIG. 3 illustrating the work clamp opening cam and cam follower connections.
FIG. 9 is a cross sectional view taken substantially along line 9—9 of FIG. 3 illustrating the clutch and the clutch stop solenoid mechanism.

If the needle thread should be broken during the stitching of a buttonhole, it is desireable to prevent the knife from cutting, since if the hole is not cut, the buttonhole may be easily repaired. To this end, thread break knife control devices are commonly used on buttonhole sewing machines of this type. In FIGS. 1 and 7 is illustrated one form of thread break knife control device which comprises a latch lever 38 delicately balanced so that when the thread breaks it will turn into the position illustrated in the drawings and latch over a pin 39 carried on the bell-crank latch lever 34 to prevent the ball crank from returning to operative position. If unbroken, the normal tension existing in the needle thread is sufficient to hold the thread break control lever out of engagement with the pin 39 so that the knife will be operated.

As will be described hereinbelow the mechanism of this invention includes a means operated by the sewing machine preferably as the sewing machine is concluding each cycle of operation for actuating or triggering the control and programming mechanism. The stop motion mechanism of the sewing machine may be used to provide such actuating or triggering of the control mechanism, however, it must be remembered that the stop motion mechanism may be tripped prematurely, and the stop motion mechanism will operate whether or not a perfect or complete tack has been stitched.

It will be appreciated, therefore, that timely release of the bell-crank latch lever 34 provides the most reliable evidence that proper completion of a stitched buttonhole is about to occur. Consequently, the return motion of the bell-crank latch lever is utilized in this invention to signal that a buttonhole has been properly completed and to trigger the succeeding step in the larger cycle of which the stitching of any one buttonhole is a part. To this end, a sensing lever 40 fulcrumed on the machine frame is slotted to embrace the pin 39 on the bell-crank latch lever and extends into the cabinet 21. The means by which movement of the sensing lever is utilized to trigger the next step in a cycle of machine operation will be described hereinbelow.

Figure 2:
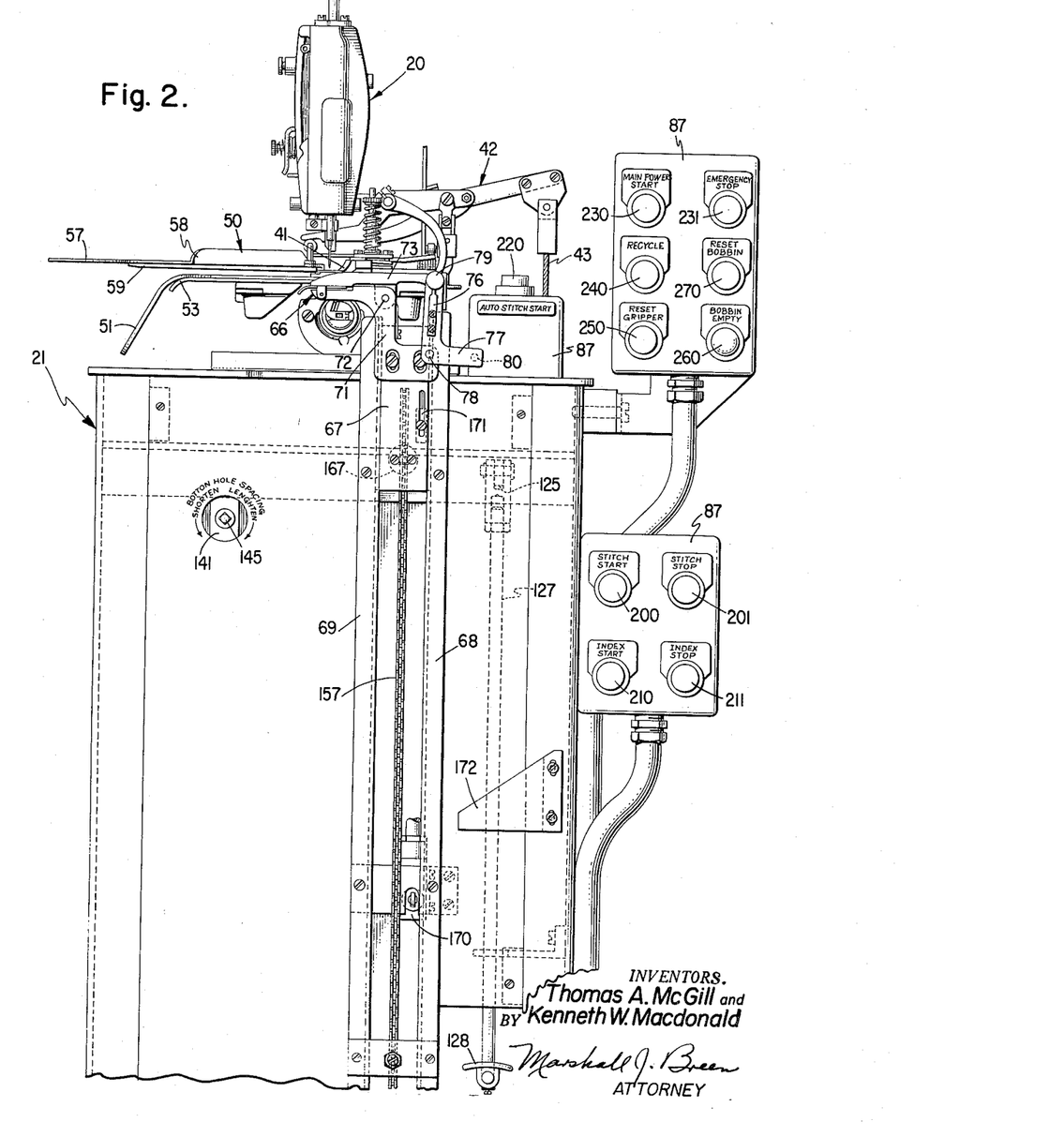
FIG. 2 represents a front elevational view of the machine of FIG. 1.
Figure 10:
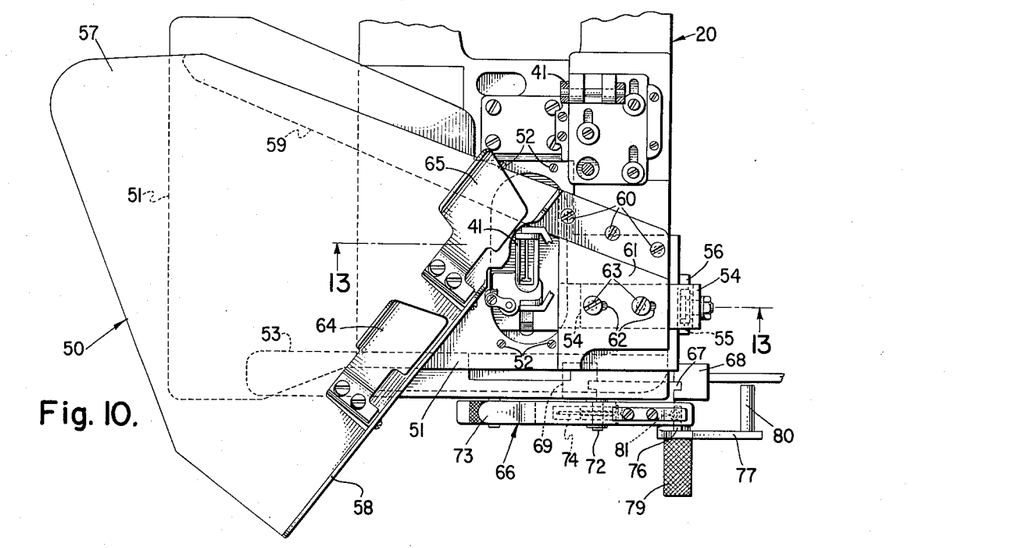
FIG. 10 represents a top plan view of the work guide as applied to the sewing machine and including the gripper mechanism.

As illustrated in FIGS. 2, 7 and 10 the sewing machine is provided with a conventional work holding clamp 41 which is spring biased into closed position. It is the function of the work clamp to grip and feed the work fabric during operation of the sewing machine thus to determine the character of the stitches. Associated with the work clamp is a clamp opening linkage identified generally as 42 in FIG. 2. A cable 43 secured to the work clamp opening linkage extends downwardly into the cabinet 21. The means by which the cable 43 is depressed to open the work clamp will be described later.

Figures 11, 12:
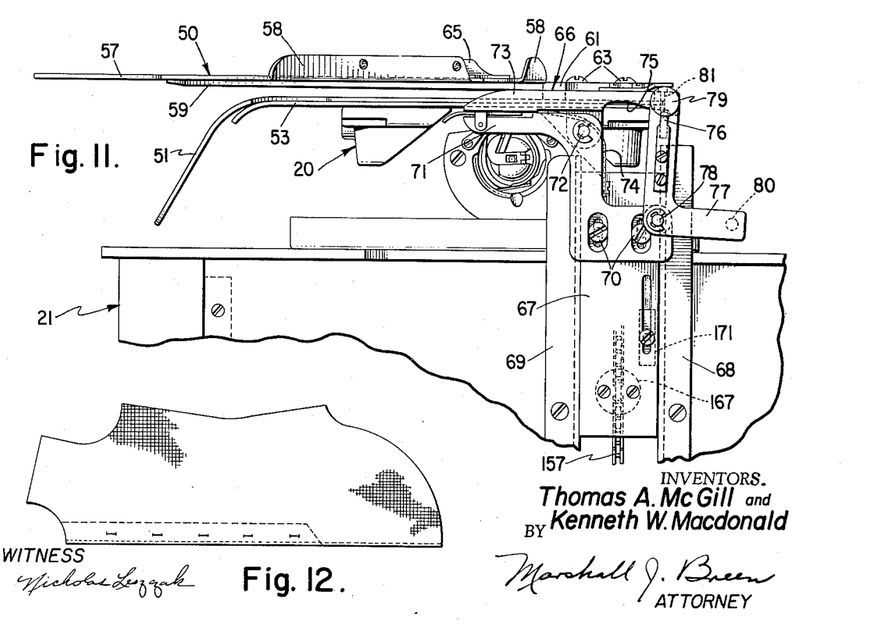
FIG. 11 represents a front elevational view of the work guide and the work gripper including a fragment of the supporting and control cabinet.
FIG. 12 is a top plan view of a garment section adapted to be operated upon by the machine of this invention.
Figure 13:
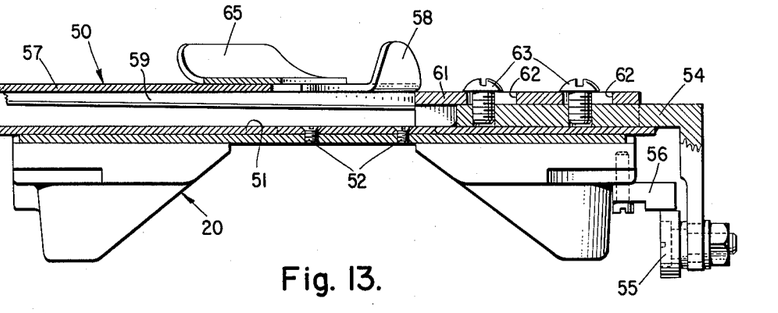
FIG. 13 is a cross sectional view taken substantially along line 13—13 of FIG. 10.

Referring to FIGS. 1, 2, 7, 10, 11 and 13 of the drawings, the sewing machine 20 is fitted with a work guide indicated generally as 50 so that a shirt front may be directed to the work clamp in proper position to have the buttonholes formed therein. As best illustrated in FIGS. 10, 11 and 13, the work guide comprises a bottom plate 51 secured by screws 52 to the lower jaw of the work clamp and provided with a stiffening strip 53 at its front edge. An angle bracket 54 is rigidly fixed to the bottom plate 51 and depends alongside the sewing machine frame. A roller 55 journaled on the bracket 54 rides under a track block 56 secured to the sewing machine bed. The work guide thus travels with the work clamp and is stabilized sidewise by the roller 55 which does not interfere with work clamp and work guide movements. A top plate 57 of the work guide is formed with a raised edge-guiding flange 58 and with a stiffening strip 59 which is secured by screws 60 to a block 61 slotted slidingly to engage the angle bracket 54. The edge guiding flange 58 is preferably disposed at an acute angle of approximately 45° to the longitudinal centerline of the buttonhole pattern produced by the sewing machine and the block 61 is formed with elongated apertures 62 through which pass fastening screws 63 by which the top plate 57 may be secured to the bottom plate with provision for limited adjustment transversely across the sewing machine. Secured to the flange 58 of the top plate 57 are two spring work pressing members 64, 65 of which the free extremities extend angularly to the edge guiding flange. The spring presser members act to control the work in passing through the guide; the spring presser 64 urging the work tightly against the edge guiding flange, and the spring presser 65 preventing the work from folding or wrinkling at the extremity of the edge guiding flange. In loading a shirt front section into the guide, the operator introduces a shirt front section between the top and bottom plates 51 and 57 of the guide face up and with the hemmed edge disposed on the right hand side as viewed in FIG. 10. The shirt front is then folded back over the top guide plate 57 and the hemmed edge introduced under the spring presser members 64 and 65 and tightly against the edge guiding flange 58. The work will thus extend bottom side up over the top guide plate 57, fold under along the rear edge of the top guide plate with the apex of the fold edge occurring at the rear extremity of the guide flange 58 and then extend face up lengthwise of the sewing machine and between the jaws of the work clamp.

Figure 14:
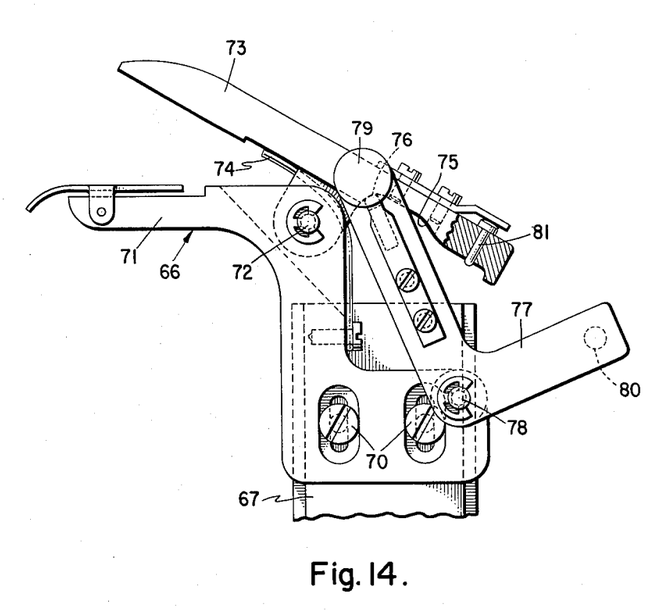
FIG. 14 represents an enlarged view of the work gripping device in which the gripper jaws are illustrated in opened position.

After the shirt front has been inserted into the guide, the beginning edge thereof is inserted between the jaws of a work gripper, indicated generally as 66, and the gripper is closed. The gripper, as best illustrated in FIGS. 10, 11 and 14 comprises a carriage block 67 slideable vertically in guide rails 68 and 69 arranged on the front of the cabinet 21. Secured to the carriage block by screws 70 is a lower gripper jaw member 71 which extends transversely across the longitudinal centerline of the buttonhole stitch pattern produced by the sewing machine. Fulcrumed on a pin 72 in the lower gripper jaw member 70 is an upper gripper jaw bar 73 biased into opened position by a spring 74 and having in the under surface a cam shaped section 75 cooperating with a finger 76 on a control bell crank lever 77 fulcrumed on a pin 78 in the lower gripper jaw member. The control bell-crank is provided with a knurled handle 79 and a release pin 80 and the upper gripper jaw bar is fitted with a spring depressed latch pin 81 which serves to hold the control bell-crank lever in the position as illustrated in FIGS. 2, 10 and 11 in which the gripper jaws are cammed tightly together.

In introducing the leading extremity of the shirt front, which is the top edge thereof, into the gripper, accurate positioning of the garment section may be attained by positioning the top edge of the garment section flush with the front of the gripper jaws. The space between the top of the garment section and the first buttonhole will thus always be constant. Thereafter the gripper carriage will be shifted downwardly by mechanism to be described hereinbelow to manipulate or index the work fabrics between successive cycles of operation of the sewing machine.

The mechanism for indexing the work fabrics between sewing machine operations and for controlling and programming the various operations in the over-all cycle of operation of the machine of this invention is contained within the cabinet 21. All of the electrical controls such as relays, counting mechanisms, etc. which do not depend upon direct physical relationship with the mechanism of this invention are preferably grouped for convenience in a common control box 82 mounted on the back of the cabinet 21. Indicated at 83 and carried atop the control box 82 is a transformer providing the proper voltages for the various power and control circuits. To one side of the sewing machine and mounted on the cabinet 21 are a plurality of switch boxes 87 in which are grouped, for convenience, the various manually operated switches and signaling devices necessary for proper control of the mechanism of this invention.

Mounted on a bracket 88 in the cabinet 21 is an indexing drive motor 89 and a speed reduction unit 90 driven by the motor 89 from which an endless chain 91 provides a constant drive to a sprocket wheel 92 journaled on a main shaft 93 extending transversely across the cabinet 21. The sprocket wheel 92 is carried on the driving portion of a one revolution clutch 94 of which the driven portion is fast on the main shaft 93. The one revolution clutch 94 is provided with a multiple trip control disc 95 having two stop shoulders 96 and 97 spaced apart 120° on the periphery thereof. Cooperating with the control disc 95 of the clutch is a clutch stop lever 98 controlled by a solenoid 99 mounted on a bracket extending across the cabinet beneath the main shaft 93. The position of the clutch and main shaft when the stop shoulder 96 is opposite to the clutch stop lever will be henceforth termed stop position No. 1; and when stop shoulder 97 is opposite to the clutch stop lever, stop position No. 2.

Also mounted in the cabinet are two normally open microswitches 100 and 110. Fast on the main shaft 93 are two cam arms 101 and 111 arranged momentarily to close microswitches 100 and 110, respectively, once during each rotation of the main shaft. The cam arm 101 is timed so as to close the microswitch 100 slightly prior to and during the stop position No. 1 and the cam arm 111 is timed to close the microswitch 110 slightly prior to and during the stop position No. 2.

To prevent retrograde movement of the main shaft 93, a pair of brake shoes 113, 114 are arranged to embrace the cam shaft. The brake shoes are biased together by springs 115 carried on bolts 116 which pass through the brake block 114 and are threaded into the brake block 113. A rod 117 rigidly secured in the brake block 113 is anchored by means of a clip member 118 secured on a cross brace 119 of the cabinet 21 to prevent the brake shoes from turning.

Figure 3:
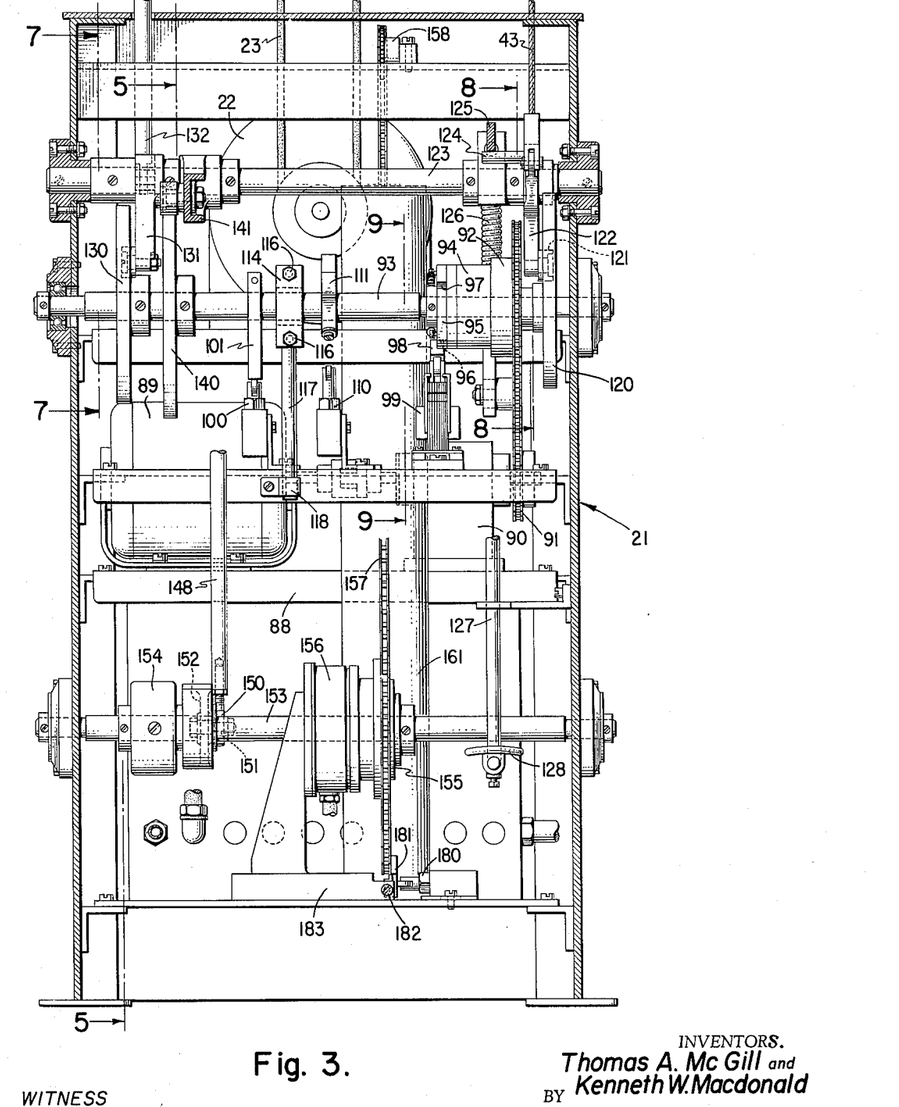
FIG. 3 is a vertical sectional view of the supporting control cabinet portion of the machine of the invention taken substantially along line 3—3 of FIG. 1.
Figure 4:
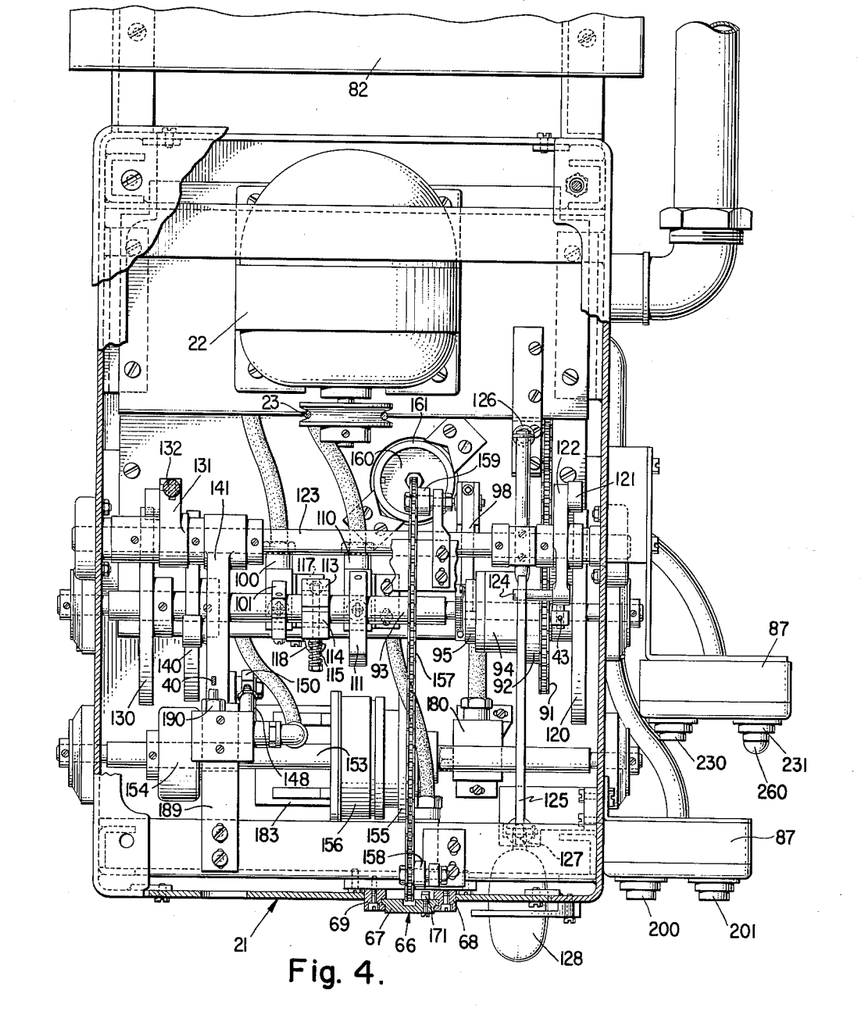
FIG. 4 is a top plan view of the supporting and control cabinet with the top of the cabinet partially broken away to expose the mechanism therein.

Fast on the main shaft 93 to the right of the one revolution clutch as viewed in FIG. 3 is a rotary actuator preferably in the form of a clamp opening cam 120 tracked by a roller follower 121 carried on one arm of a bell-crank follower lever 122 fulcrumed on a pivot shaft 123 extending transversely across the cabinet 21. The clamp opening cable 43 is secured to the other arm of the bell-crank 122 and a pin 124 projecting from the bell-crank adjacent the cable connection underlies a manual operating lever 125 fulcrumed on the pivot shaft 123 and biased by a spring 126 into an inoperative position. The manual clamp opening lever 125 is pivoted at the front of the cabinet, to a vertical slide-rod 127 which has a foot pad 128 secured at its lower extremity. Although sewing machines of the type illustrated are frequently fitted with mechanical interlocks preventing opening of the work clamp while the machine is running, the machine operator may open the work clamp at any other time by depressing the pad 128 with her foot.

Fast on the main shaft 93 at the left hand extremity thereof, as viewed in FIG. 3, is a rotary actuator preferably in the form of a sewing machine starting cam 130. A bell-crank 131 fulcrumed on the pivot shaft 123 is connected to a push rod 132 journaled in a bushing 133 in the top of the cabinet 21. A roller 134 carried in a lever 135 fulcrumed on the sewing machine frame bears against the top of the push rod 132, and at the other extremity the lever 135 bears upon the collar 31 on the stop motion frame plunger rod 29. The start cam 130 will thus have the effect of shifting the stop motion frame into the position in which the sewing machine will begin a cycle of sewing operations.

Figures 5, 6:
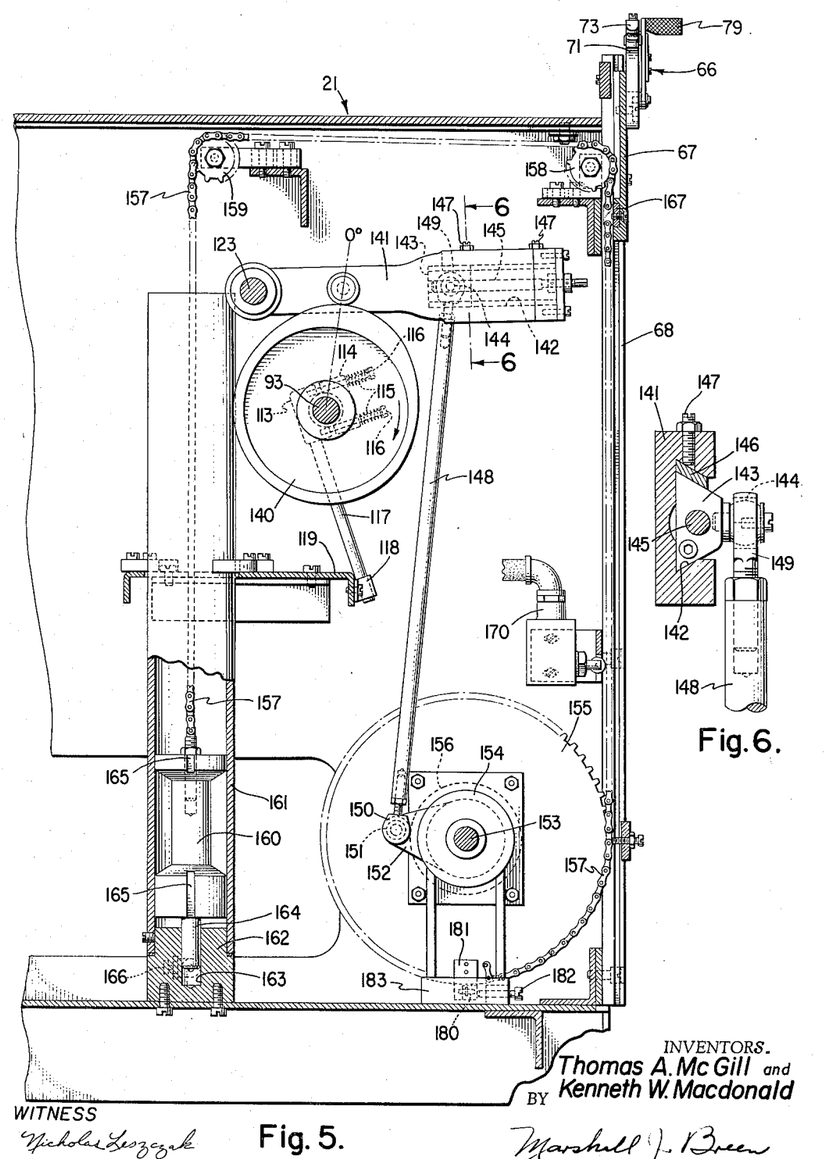
FIG. 5 is a vertical sectional view of the supporting and control cabinet taken substantially along line 5—5 of FIG. 3 illustrating the indexing mechanism of the gripper carriage.
FIG. 6 is a cross sectional view of the gripper indexing cam follower arm taken substantially along line 6—6 of FIG. 5.

To the right of the start cam 130, as illustrated in FIG. 3 on the main shaft 93 is fixed a rotary actuator preferably in the form of a work indexing cam 140. An indexing cam follower lever 141 fulcrumed on the pivot shaft 123 carries a roller follower which rides on the indexing cam. The lever 141 is formed with an undercut slot 142 at the free extremity slideably to accommodate a block 143 to which a knuckle pin 144 is secured. By means of an adjusting screw 145, the block 143 may be adjusted along the slot 142 toward and away from the lever fulcrum. A gib 146 in the slot 142 and lock screws 147 may be used to lock the block 143 in selected position of adjustment. A connecting rod 148 carries at its upper end a socket member 149 disposed to embrace the knuckle pin 144, and at its lower end a socket member 150 embracing a knuckle pin 151 carried by a rock arm 152 journaled on an indexing shaft 153 which extends transversely across the cabinet 21. The rock arm 152 is operatively connected to the indexing shaft by way of a sprag type one way clutch 154. The clutch 154 is arranged such that motion of the rock arm in a clockwise direction as viewed in FIG. 5 is transmitted to the indexing shaft. Also journaled on the indexing shaft 153 is a large sprocket wheel 155 which is operatively connected to the shaft by means of an electrically operated magnetic clutch 156. The clutch 156 as illustrated in FIGS. 1 and 3 is also secured to a bracket 183 of the cabinet 21 so that in addition to clutching the sprocket wheel 155 to the shaft 153, the clutch 156, when energized, frictions the sprocket wheel 155 and the shaft 153 to prevent retrograde movement thereof. When the magnetic clutch 156 is operative, therefore, the movements of the indexing cam follower lever in one direction are transmitted to the sprocket wheel and each cycle of movement of the main shaft 93 will cause the sprocket wheel to be turned a predetermined amount. By loosening the lock screws 147 and turning the adjusting screw 145, the amount of turning of the sprocket wheel during each cycle of main shaft rotation and hence the spacing between successive buttonholes may be selectively determined.

A link chain 157 which provides a flexible conveyor is secured to the sprocket wheel 155 and extends vertically upwardly between the carriage block guide rails 68 and 69 over a pair of idler sprockets 158 and 159 and downwardly to a counterweight 160 disposed within a vertically arranged cylindrical pipe 161. The pipe 161 and the counterweight 160 serve as a dash pot in cushioning the return of the indexing mechanism when the electrically operated magnetic clutch is released. The pipe 161 is seated in a base block 162 formed with a small bore 163 aligned with a plunger rod 164 depending from the counterweight 160. Vent slots 165 formed in the counterweight provide for relatively rapid escape of air trapped in the pipe between the counterweight and the base block as the counterweight moves downwardly in the pipe. As the counterweight nears the base block, however, the plunger rod 164 enters the bore 163 and escape of the air trapped in the bore is controlled by a valve 166 so that an increased cushioning action is obtained. With this construction the return motion may be accomplished quickly, smoothly and without harsh shocks which might tend to disturb the adjustment of the machine parts.

As best illustrated in FIG. 5, a clamp insert 167 in the gripper carriage block 67 serves to secure the gripper carriage to the link chain 157 so that the gripper will be moved downwardly in increments as the indexing mechanism is operated in each revolution of the main shaft 93.

Mounted in the cabinet adjacent the guide rails 68 and 69 is a normally open microswitch 170, in position to be engaged and closed by a cam member 171 adjustably secured to the gripper carriage as the carriage moves downwardly along the guide rails. Secured to the front of the cabinet 21 and projecting toward the guide rails 68 and 69 is a trip lug 172 disposed in the path of the release pin 80 on the control bell crank 77 for the gripper. As the gripper carriage in indexed downwardly, the release pin in striking the trip lug 172 will serve to open the gripper and release the work so that the gripper carriage will thereafter return empty to the starting position.

Mounted at the bottom of the cabinet 21 is a normally closed microswitch 180 adapted to be held open by a cam lug 181 carried by the sprocket wheel 155 when the sprocket wheel is returned to starting position by the counterweight 160. The cam lug 181 also serves as a stop lug in cooperation with a stop screw 182 threaded through a block 183 secured to the cabinet 21. The stop screw 182 cooperates with the cam lug 181 to determine the initial position of the gripper carriage 67, and by adjusting the stop screw 182 a micrometer adjustment may be made of the initial position of the work gripper with respect to the sewing machine stitching point.

Within the cabinet 21 and directly beneath the sewing machine on a bracket 189 is mounted a normally open microswitch 190 disposed for engagement by the sensing lever 40 connected to the buttonhole knife actuating mechanism of the sewing machine.

As illustrated in FIG. 2, the arrangement of switches and signaling equipment in the switch boxes 87 is such that the switches 200 and 201 for starting and stopping the sewing machine motor and the switches 210 and 211 for starting and stopping the indexing motor 89 are grouped in one box. A momentary contact automatic start switch 220 which serves to initiate each new cycle of machine operation is placed for convenience in a separate switch box, and the remaining switches are grouped in a third box and comprise the main power start switch 230, an emergency stop switch 231, a momentary contact switch 240 for reestablishing or recycling the operation of the machine should continuity be broken for any reason, and a momentary contact switch 250 for returning the gripper carriage to starting position at any time.

As will be described later, this machine includes a provision for automatically signaling the impending exhaustion of the bobbin thread supply of the sewing machine and for temporarily disabling the programming mechanism at the end of a cycle when this occurs. The operator may thus replace the nearly exhausted bobbin rather than have the thread run out during a cycle. Included in the last mentioned switch box, therefore, is a signal light 260 to indicate bobbin exhaustion, and a momentary contact switch 270 by which the programming circuit may again be rendered effective after the bobbin has been replaced.

Figure 15:
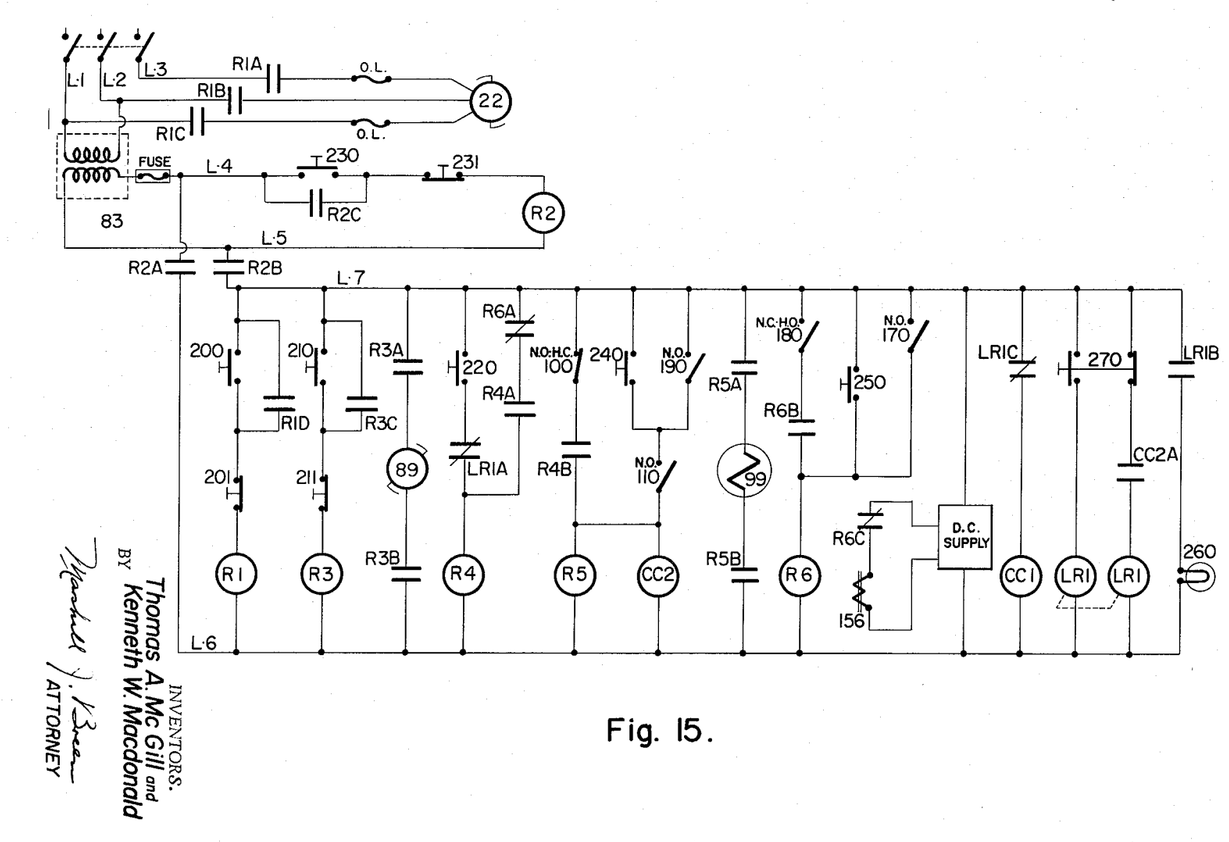
FIG. 15 is a circuit diagram of the electrical control and programming devices of this machine.

Referring to FIG. 15, which is a circuit diagram for the control and programming circuits for the machine of this invention in which the contacts are illustrated in the positions occupied when the sewing machine is at rest at the start of a complete cycle of operation, the operation of this machine will now be described together with the electrical circuits which may be employed.

Figure 16:
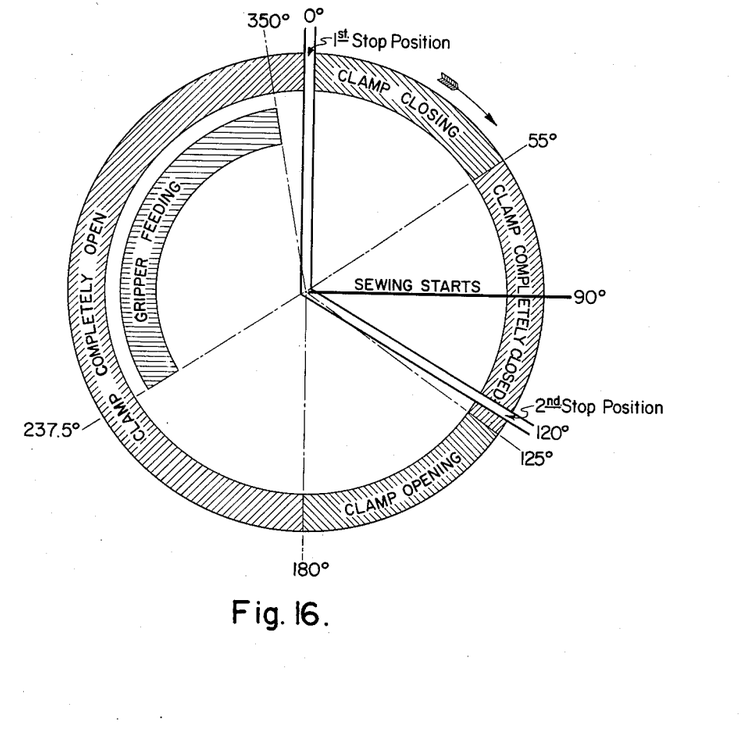
FIG. 16 is an operating sequence diagram illustrating the timing of the various events in a cycle of operation of the control cam shaft.
Figure 17:
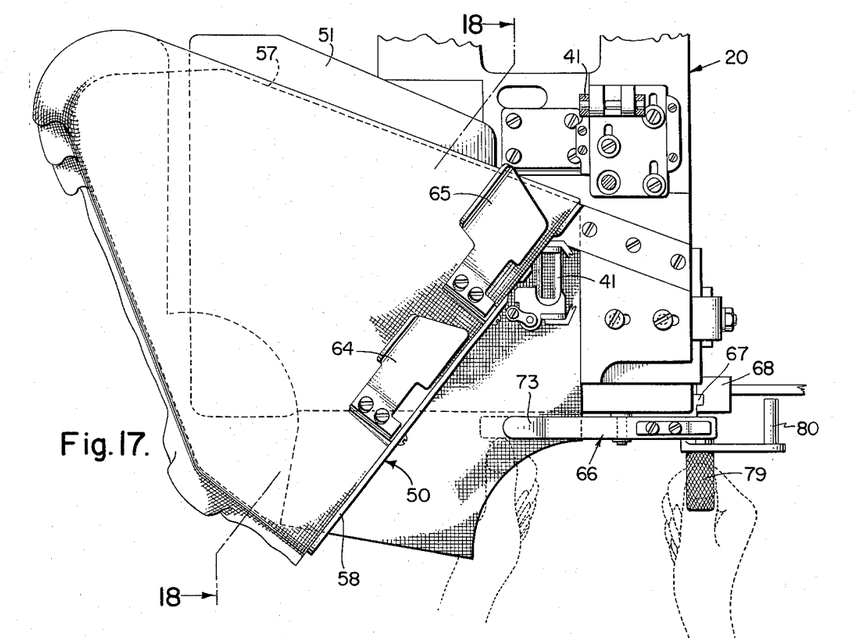
FIG. 17 represents a top plan view of the work guide as applied to the sewing machine including an illustration of a work piece as it is initially loaded into the guide.
Figure 18:
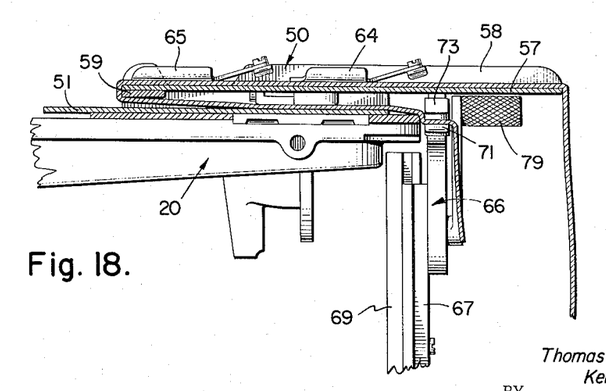
FIG. 18 is a cross sectional view taken substantially along line 18—18 of FIG. 17.

When the machine is at rest and ready to begin a new cycle of operation, the main shaft 93 is held in stop position No. 1 by the clutch stop lever 98 in engagement with the stop shoulder 96 of the one revolution clutch 94. Considering the main shaft 93, therefore, and the cams carried thereby, the clamp opening cam 120 is disposed to hold the work clamp open. The cam arm 101 is in engagement with microswitch 100 holding it closed. Microswitch 110 is open. The work indexing cam 140 is returning the indexing mechanism, and the one way clutch 154 will prevent any return motion from being imparted to the indexing shaft 153. The start cam bell crank follower 131 is tracking an idle portion of the start cam 130. The angular notations on the cams 120, 130, and 140 on cam shaft 93 in FIGS. 5, 7, and 8 are all oriented with respect to stop position No. 1 and thus the 0° notation on each of these cams indicates that portion of the cam being tracked when the machine is at rest. FIG. 16 may also be referred to for a graphic illustration of the timed relation of the various operations during a typical cycle of rotation of the main shaft 93.

When the machine is at rest and ready to begin a new cycle of operation, the gripper carriage is at the top of the guide rails 68 and 69 having been returned by the counterweight 160. The microswitch 170 is therefore open and the microswitch 180 will be held open by the cam lug 181 on the sprocket wheel 155. The microswitch 190 will also be in its normal open position.

Referring particularly to the circuit diagram of FIG. 15, the relays are designated R, CC, and LR corresponding respectively to plain relays, coils of a counting relay and latch relays, and the designation of each of the contacts includes the designation of the relay by which it is controlled, as for instance, contacts R1A, R1B, R1C and R1D being controlled by relay R1. In the diagram, the source of electrical current is represented by lines L1, L2 and L3 supplying three phase power directly to the sewing machine motor 22 with contacts R1A, R1B and R1C, one in each line. Lines L1 and L3 include overload fuses for the protection of the motor 22. Lines L1 and L2 supply single phase power to the transformer 83, from the secondary of which lines L4 and L5 provide a main power control circuit, line L4 being fused and including the main power start switch 230, the emergency stop switch 231, a relay R2, and the holding contacts R2C in parallel with the main power start switches. Lines L4 and L5 supply the control buses L6 and L7 between which the various control and supply circuits are made, contacts R2A and R2B controlled by relay R2 connect the control buses L6 and L7 to the transformer when the main power start switch 230 is closed.

The sewing machine motor start and stop switches 200 and 201 are in series with a relay R1 between the control buses, contacts R1A, R1B, and R1C in the lines L1, L2 and L3 being controlled by the relay R1 as are the holding contacts R1D in parallel with the start switch 200.

The indexing drive motor start and stop switches 210 and 211 are in series with a relay R3 across the control buses, contacts R3A and R3B being in series with the index drive motor 89 across the control buses and holding contacts R3C being in parallel with the start switch 210.

Both the sewing machine motor 22 and the indexing motor 89 are normally operated continuously and would be running idly while the machine is at rest and ready to begin a new cycle.

After a shirt section has been placed in the work guide and the gripper has been closed on the work, the cycle of machine operation is initiated by closure of the start switch 220 by the operator. Assuming that the bobbin thread supply is sufficient so that the bobbin exhaustion signaling devices will not interfere the start switch 220 is in series with normally closed contacts LR1A of the bobbin exhaustion circuit and with a relay R4. In parallel with the start switch 220 and contacts LR1A is a holding circuit including normally closed contacts R6A to be described later, and holding contacts R4A operated by the relay R4 to keep the relay R4 energized even after the start switch is released. Since the microswitch 100 is held closed by the cam arm 101, and the contacts R4B will close when relay R4 is energized, the relay R5 will be energized when the start switch 220 is closed. Relay R5 controls contacts R5A and R5B in series with the clutch stop solenoid 99 across the control buses, and the solenoid when energized will release the clutch stop lever 98 from the stop shoulder 96 and engage the clutch to establish positive driving relation between the sprocket 92 and the main shaft 93.

As the main shaft turns from stop position No. 1 toward stop position No. 2 the following sequence of events occur:

(1) The cam arm 101 leaves the microswitch 100 which returns to normally open position. Referring to the circuit diagram of FIG. 15, the opening of microswitch 100 deenergizes relay R5 which deenergizes the clutch stop solenoid 99, thus releasing the clutch stop lever to ride along the periphery of the clutch control disc 95 ready to stop the clutch in stop position No. 2.

(2) The clamp opening cam 120 is turned and as indicated in the diagram of FIG. 16 and also in FIG. 8, proceeds to close the work clamp, completing closure after approximately 55° of main shaft 93 rotation.

(3) After approximately 90° of main shaft rotation of start cam 130 causes the sewing machine stop motion frame to be shifted to running position and the sewing machine begins to sew.

(4) As the main shaft 93 approaches 120° of rotation, the cam arm 111 engages and closes the microswitch 110.

(5) At 120° of main shaft rotation, the clutch stop lever 98 engages the stop shoulder 97 on the clutch control disc and stops the camshaft, microswitch 110 being held closed by the cam arm 111.

(6) The work indexing cam 140 during the camshaft rotation from 0° to 120° will complete its return movement of the indexing mechanism, the sprag type one way clutch 154, however, will isolate this return movement from the indexing shaft 153.

With the indexing mechanism stopped in stop position No. 2, the sewing machine will complete a cycle of operation producing a buttonhole in the shirt front. The sewing machine stop motion mechanism will stop the sewing machine automatically at the completion of the buttonhole, and if the sewing thread is unbroken and the stop motion mechanism operates after the desired number of stitches have been made, the bell crank latch lever 34 in the buttonhole knife actuating linkage will be released and return to operative position thus turning the sensing lever 40 and closing microswitch 190.

Referring to the circuit diagram of FIG. 15, the closing of microswitch 190 completes a circuit between the control buses through the microswitch 110 which is held closed by the cam arm 111 on the main shaft 193, and the relay R5. Energizing of relay R5 serves to close the contacts R5A and R5B in the clutch stop solenoid circuit and to energize the solenoid, thus releasing the clutch stop lever 98 from the stop shoulder 97 and engaging the clutch to establish positive driving relation between the sprocket 92 and the main shaft 93.

As the main shaft turns from the stop position No. 2 toward the stop position No. 1, the following sequence of events occur:

(1) The cam arm 111 leaves the microswitch 110 which returns to normally open position. Referring to the circuit diagram of FIG. 15, the opening of microswitch 110 deenergizes the relay R5 and the clutch stop solenoid 99, thus releasing the clutch stop lever to ride along the periphery of the clutch control disc 95 ready to stop the clutch in stop position No. 1.

(2) The work clamp opening cam 120 is turned and, as indicated in the diagram FIG. 16 and also in FIG. 8, opens the work clamp, completing this operation at approximately 180° of main shaft rotation (considered from stop position No. 1).

(3) The work indexing cam 140 oscillates the cam follower lever 141, and indexes the gripper carriage a distance down the guide rails 68 and 69 as determined by the adjustment of the knuckle pin block 143 in the cam follower lever. The one way clutch 154 transmits the motion of cam 140 from the connecting rod 148 to the indexing shaft 153 and turns the sprocket wheel 155 by way of the magnetic clutch 156 which as indicated in the circuit diagram is operative because of the normally closed contacts R6C with which it is in series. The first movement of the sprocket wheel carries the cam lug 181 on the sprocket wheel 155 out of engagement with the normally closed microswitch 180. In closing, the microswitch 180 does not have an immediate effect since the contacts R6B with which it is in series remain open. The circuit containing microswitch 180 is, however, put into readiness for later use as a holding circuit as will be described hereinafter. The work indexing cam 140 begins indexing of the work at approximately 237½° of main shaft rotation and completes indexing of the work at approximately 350° of main shaft rotation and thereafter proceeds in a return movement. The return movement of the indexing mechanism is, however, an idle movement as explained above because of the one way clutch 154.

(4) As the main shaft 93 approaches 360° of rotation, the cam arm 101 engages and closes the microswitch 100. Since the relay R4 is energized because of the holding circuit parallel to the automatic start switch 220, the closing of microswitch 100 completes a circuit through contacts R4B, which are closed by the relay R4, and energizes the relay R5. The relay R5, as before, in being energized, closes contacts R5A and R5B and energizes the clutch stop solenoid 99. The clutch stop lever will thus be drawn away from the clutch control disc while the stop shoulder 96 for stop position No. 1 is by-passed and the cam shaft will continue to rotate. The cam shaft, in turning from stop position No. 1 to stop position No. 2 will accomplish the same sequence of events as was described above, terminating with the main shaft 93 stopped in stop position No. 2 and a new cycle of sewing machine operation being initiated.

It will thus be apparent that stop position No. 2 constitutes a main stopped position since it occurs after complete indexing of the work and after the sewing machine start mechanism has been actuated. Stopped position No. 1 constitutes an intermediate stopped position in which the automatic operation of the sewing unit has been interrupted so that a new work fabric may be loaded in the sewing unit.

This alternate cycling of the sewing machine operation and main shaft 93 rotation will continue and buttonholes will be formed in spaced relation along the hemmed edge of the shirt front until the gripper carriage in being indexed between sewing machine operations carries the cam member 171 into engagement with the microswitch 170.

Referring to the circuit diagram of FIG. 15, closing of the microswitch 170 completes a circuit between the control buses and energizes relay R6 which relay opens the normally closed contacts R6A and R6C and closes the normally open contacts R6B. The contacts R6B in closing complete the holding circuit above referred to including the microswitch 180 which thereby continues to energize the relay R6. In opening the contacts R6A, the holding circuit for relay R4 is broken and relay R4 is deenergized. The contacts R4B controlled by relay R4 thus open and the microswitch 100 which in all previous cycles of revolution of the main shaft 93 served to bypass the stop position No. 1 will no longer serve that purpose. The main shaft 93 will therefore be stopped in stop position No. 1. The relay R6 in opening the contacts R6C, breaks the D.C. current controlling the magnetic clutch 156 and the sprocket wheel 155 is then freed with respect to the indexing shaft 153. The counterweight 160 will thus act to return the gripper carriage to the top of the guide rails 68 and 69 and to turn the sprocket wheel back to the starting position in which the cam lug 181 on the sprocket wheel engages and opens the microswitch 180. When microswitch 180 is opened, the holding circuit for relay R6 is broken and relay R6 is deenergized, contacts R6C are again returned to closed position reenergizing the magnetic clutch in preparation for the succeeding cycle of operation, and contacts R6A are returned to closed position readying the holding circuit for the automatic start switch 220 for operation. Since the main shaft 93 will be stopped at stop position No. 1, the sewing machine will remain at rest and the entire cycle will be terminated.

The trip lug 172 on the front of the cabinet is preferably positioned so as to strike the release pin 80 on the gripper control bell crank to open the gripper and release the work just prior to the engagement of the cam member 171 on gripper carriage with the microswitch 170. In this manner, the gripper will be opened and the work released so that the gripper carriage can return empty to starting position.

Since the sewing machine is of the lock stitch type employing a bobbin thread, it will be appreciated that a garment section could be spoiled if the bobbin thread supply were to become exhausted during a cycle of machine operation. To prevent this, the control circuit for the machine chosen to illustrate this invention employs an electrically operated counter having a counting coil controlled relay CC2 arranged in parallel with the relay R5 and a counter-clutch coil CC1 which when energized renders the counting coil relay CC2 effective to begin counting. Since relay R5 is energized each time the solenoid 99 is actuated to start the main shaft rotation which will start the sewing machine, the number of actuations of relay R5 corresponds to the number of buttonholes produced. The number of buttonholes which may safely be made with a full bobbin of thread can easily be ascertained empherically and the counter can be set at some slightly lower value to allow for slight variation in the amount of bobbin thread used. The counter-clutch coil CC1 is arranged in series with the normally closed contacts LR1C controlled by a set of latch relays LR1. One of the latch relays is arranged in series with contacts CC2A controlled by the counting coil relay CC2, and the latch relays are also wired in series with a reset switch 270 which when depressed energizes the latch relays to close contacts LR1C and render the clutch coil effective. Thereafter when counting coil relay CC2 has been pulsed a predetermined number of times, it will operate to close the contacts CC2A which will energize the latch relays and open contacts LR1C. The contacts LR1A in series with the automatic start switch 220 are also controlled by the latch relays to disable the start switch after the counting coil has registered the completion of a predetermined number of buttonholes. The operator cannot, therefore, inadvertently start a new cycle until she has reset the bobbin reset switch 270 and presumably replaced the nearly empty bobbin. The latch relays also control contacts LR1B in series with a signal lamp 260 which provides a visual reminder to the operator that the bobbin thread supply needs to be replenished.

From the above it will be seen that this invention provides an organized machine for completing automatically all like sewing operations on a garment or a garment section. Since the machine of this invention is cyclic in operation and adapted to accommodate separate garment sections, the machine is compatible with present day methods of garment manufacture which for practical reasons dictate that the various sections of the garment be cut from the same portion of a bolt of cloth and that, therefore, sewing operations must be accomplished on individual garment sections.

Having thus set forth the nature of the invention, what we claim herein is:

1. A sewing unit comprising a frame, a sewing machine carried on said frame and including a work support and stitch forming mechanism defining a stitching point with respect to said work support, a work gripping device adapted to grip the leading edge of a fabric article, means shiftably supporting said work gripping device on said frame for bodily movement away from said sewing machine stitching point to index the fabric article relatively to said stitching point and toward the sewing machine stitching point to return the work gripping device for operation on a succeeding fabric article, means defining a predetermined initial position of said work gripping device with respect to said stitching point, means for shifting said work gripping device away from said sewing machine stitching point in predetermined increments to index a work fabric with respect to said stitching point, means cooperating with said work gripping device during movement of said work gripping device away from said stitching point for maintaining said fabric article taut from said stitching point to said work gripping device, and automatically operable mechanism for effecting alternate sewing machine and work indexing operations.

2. A sewing unit comprising a frame, a sewing machine carried on said frame and including a work support and stitch forming mechanism defining a stitching point with respect to said work support, a work gripping device, means shiftably supporting said work gripping device on said frame for bodily movement toward and away from said sewing machine stitching point, means defining a predetermined initial position of said work gripping device with respect to said sewing machine work support, work fabric guiding means carried by said sewing machine for directing a work fabric to the stitching point, means for shifting said work gripping device to index a work fabric through said guiding means and with respect to said stitching point, means for operating said sewing machine, automatically operable mechanism for effecting a predetermined series of alternate sewing machine and work indexing operations, and means effective upon completion of said series of alternate operations for returning said work gripping device to said predetermined initial position.

3. A sewing unit comprising a frame, a cyclically operable sewing machine carried on said frame and including stitch forming instrumentalities and a stop motion mechanism operative to stop said sewing machine automatically after completion of a predetermined number of operations of said stitch forming instrumentalities, a work indexing mechanism including a work gripping device shiftably supported on said frame for bodily movement relatively to said sewing machine, and means associated with said work gripping device for clamping and maintaining the leading edge of a work fabric panel clamped thereto, means for guiding said work fabric panel to the sewing machine stitching point, tensioning means associated with said guiding means for maintaining said work fabric panel taut from said stitching point to said work gripping device, and a control mechanism associated with said sewing unit and including mechanism for starting said sewing machine, mechanism for shifting said work gripping device, and automatically operable means for effecting sequential operation of said starting mechanism and said shifting mechanism.

4. A sewing unit comprising a frame a sewing machine carried by said frame and having an endwise movable work penetrating needle, stitch forming instrumentalities cooperating with said needle, and a work feeding mechanism adapted to grip and transport a work fabric between successive needle penetrations, mechanism for releasing a work fabric from the grip of said sewing machine work feeding mechanism, a work indexing mechanism including a member supported on said frame for movement relatively to said sewing machine work feeding mechanism, means for clamping and maintaining a work fabric clamped to said member during the operation of said sewing unit, means for operating said sewing machine work feeding mechanism to advance said work fabric only in a direction toward said work indexing member, mechanism for shifting said member relatively to said sewing machine work feeding mechanism, and a control mechanism associated with said sewing unit for automatically rendering said work feeding mechanism and said sewing machine work indexing mechanism alternately effective and means for operating the releasing mechanism of said sewing machine work feeding mechanism during operation of said work indexing mechanism.

5. A mechanism for automatically stitching a fabric article comprising, a sewing machine having a stitching point, work guiding means associated with said sewing machine for directing a fabric article to the sewing machine stitching point in a predetermined manner, a work gripping device having a predetermined initial position with respect to the sewing machine stitching point, means for clamping said work gripping device to the leading edge of a work fabric panel issuing from said work guiding means, means for imparting bodily movement to said work gripping device to index a fabric article through the work guiding means, and automatically operable mechanism for effecting a predetermined sequence of sewing machine and work indexing operations.

6. A mechanism for automatically stitching a fabric article comprising a cyclically operated sewing machine including stitch forming instrumentalities, a work clamp, opposed jaws on said work clamp between which a work fabric may be clamped, means for shifting said work clamp with respect to said sewing machine in timed relation with said stitch forming instrumentalities to produce a pattern of stitches, and means for opening said work clamp jaws after each cycle of sewing machine operation, a work guide carried by said sewing machine work clamp for movement therewith, means on said work guide for locating a fabric article in a predetermined position with respect to said sewing machine work clamp, a work indexing mechanism including means for gripping a fabric article extending through said work guide, and operating means for imparting bodily movement to said work gripping means with respect to said work guide, and a control mechanism for actuating the operating means of said work indexing mechanism only when said sewing machine work clamp jaws are open.

7. A mechanism for automatically stitching a fabric article comprising a sewing machine including stitch forming instrumentalities, a start and stop motion mechanism, and a work clamp, a work indexing mechanism including a work gripper shiftably supported for movement toward and away from said sewing machine stitch forming instrumentalities, a control mechanism for said sewing machine and work indexing mechanism including a rotatable shaft, mechanism for driving said shaft, three rotary actuators each disposed in driven relation with said shaft and in timed relation with each other, operative connections between a first of said rotary actuators and said sewing machine work clamp effective to open and close said work clamp, operative connections between a second of said rotary actuators and said work indexing mechanism effective to shift the work gripper away from said sewing machine stitch forming instrumentalities while said work clamp is held open by said first rotary actuator, operative connections between a third of said rotary actuators and said sewing machine start and stop motion mechanism effective to start said sewing machine when said work clamp is closed by said first rotary actuator, means for interrupting said shaft driving mechanism and for stopping said shaft in a main stopped position in which said work clamp is closed and said third rotary actuator has started said sewing machine, means on said sewing machine and effective during operation of said sewing machine for shifting said interrupting and stopping means of said shaft driving mechanism out of said main stopped position, means controlled by the movement of said shiftable work gripper for interrupting said shaft driving mechanism and for stopping said shaft in an intermediate stopped position in which said work clamp is held open by said first rotary actuator, and manually operable means for shifting said interrupting and stopping means of said shaft driving mechanism out of said intermediate stopped position.

8. A mechanism as set forth in claim 7 in which the means for driving the rotatable shaft of the control mechanism comprises a continuously driven member, a clutch device interposed between said continuously driven member and said shaft, and in which the means for interrupting and stopping the shaft driving means comprises a clutch control disk fast on said shaft, a pair of radially extending shoulders formed on said control disk said shoulders defining said main and intermediate stopped positions of said shaft, and a stop member shiftably supported for movement into and out of the path of movement of said shoulders.

9. In a mechanism for automatically stitching a fabric article as set forth in claim 7, a counting mechanism, means for pulsing said counting mechanism once during each cycle of sewing machine operation, and means operated by said counting mechanism after a predetermined number of pulses have been applied thereto for rendering ineffective said manually operable means for reestablishing the drive of said shaft out of said intermediate stopped position.

10. A sewing unit comprising a sewing machine having stitch forming instrumentalities defining a stitching point on said sewing machine, a sewing machine support, a work indexing mechanism including a track carried by said sewing machine support, said track extending toward and away from said sewing machine, a carriage constrained to move along said track, a work gripping device secured to said carriage, a work guiding means carried by said sewing machine for directing a work fabric panel to said stitching point and to said carriage, and means for shifting said carriage away from said sewing machine to index a work fabric with respect to said sewing machine stitching point, and automatically operable mechanism for effecting alternate sewing machine and work indexing operations.

11. A sewing unit comprising a sewing machine having stitch forming instrumentalities defining a stitching point on said sewing machine, drive mechanism for said sewing machine, a work indexing mechanism including a work gripper shiftably supported for movement in a path toward and away from said sewing machine stitching point, means defining a predetermined initial position of said work gripper with respect to said sewing machine stitching point, a work fabric guiding means carried by said sewing machine for directing a work fabric to the stitching point, work indexing drive mechanism for shifting said work gripper away from said stitching point, work fabric tensioning means associated with said work fabric guiding means for maintaining said work fabric taut from said stitching point to said work gripper, automatically operable mechanism for effecting alternate operation of said sewing machine and indexing drive mechanisms, and means for returning said work gripper to said predetermined initial position, said means including a sensing device disposed in the path of movement of said work gripper, and means rendered effective by actuation of said sensing device by said work gripper for returning said work gripper to said predetermined initial position.

12. A sewing unit as set forth in claim 11 in which the means rendered effective by actuation of said sensing device for returning said work gripper to said predetermined initial position includes a means rendered effective by actuation of said sensing device for interrupting said work indexing drive mechanism, and a counterweight operatively arranged to return said work gripper to said predetermined initial position when said work indexing drive mechanism is interrupted.

13. A mechanism for automatically stitching a fabric comprising a cyclically operated sewing machine having stitch forming instrumentalities defining a stitching point with respect to said sewing machine, a sewing machine support, a track formed on said sewing machine support and disposed to extend toward and away from said sewing machine stitching point, a work gripping device slidable along said track, a flexible conveyor, means constraining at least a portion of said conveyor in a position substantially parallel to said track, means securing said work gripping device to said conveyor, said work gripping device including a carriage slidable along said track, a pair of articulated work gripping jaws carried by said carriage, one of said pair of jaws being fixedly secured on said carriage, bearing means associated with said fixedly secured jaw pivotally supporting the other of said pair of jaws, a lever pivotally secured to said carriage, one arm of said lever being movable in a path substantially perpendicular to the said track, an operator influenced handle carried on said lever and an abutment means carried on said lever for engagement with said pivoted work gripping jaw to open and close said jaws upon movement of said operator influenced handle perpendicularly toward and away from said track, means for moving said conveyor to index a work fabric held in said work gripping device, and automatically operable mechanism for effecting alternate sewing machine and work indexing operations.

14. A sewing unit for automatically stitching a fabric article comprising a cyclic sewing machine including stitch forming instrumentalities, a start and stop mechanism, and a work clamp, a work indexing mechanism for shifting a work fabric relatively to said sewing machine work clamp, control mechanism for said sewing machine and working indexing mechanism including a shaft, means driven by said shaft for effecting in seriatim opening of the sewing machine work clamp, actuation of said work indexing mechanism, closing of said sewing machine work clamp, and actuation of said sewing machine start mechanism, means for driving said shaft, means for stopping said shaft and interrupting said shaft driving means after operation of said means for actuating said machine start mechanism, a solenoid operatively connected to render said means for stopping said shaft and interrupting said shaft driving means ineffective when said solenoid is energized, an electrical circuit for energizing and controlling said solenoid, manually operated switch means in said circuit effective to energize said solenoid to initiate automatic operation of said sewing unit, switch means in said circuit and disposed for operation by said sewing machine during operation of said sewing machine for energizing said solenoid thereby automatically to affect alternate sewing machine and work indexing operations, and switch means in said circuit disposed for actuation by said work indexing mechanism for rendering said sewing machine operated switch means ineffective thereby terminating automatic operation of said sewing unit.

15. In a sewing unit as set forth in claim 14 an electrically operated counting mechanism, means in said electrical circuit for pulsing said counting mechanism once each time said solenoid is energized, a stop switch in said electrical circuit for rendering said manually operated switch means ineffective, and means operated by said counting mechanism for actuating said stop switch after a predetermined number of pulses have been applied to said counting mechanism.

16. A mechanism as set forth in claim 13 in which the lever for opening and closing the work gripping jaws is a bell crank lever having one arm movable in a path substantially perpendicular to the track said operator influenced handle carried on said last mentioned arm, the other arm of said bell crank lever movable in a path substantially parallel with said track; and abutment means carried on said sewing machine support for engagement with said last mentioned bell crank arm automatically to effect opening of said work clamp jaws upon a predetermined movement of said work gripping device along said track.

References Cited in the file of this patent

UNITED STATES PATENTS

| | | |
|---|---|---|
| 473,564 | Allen | Apr. 26, 1892 |
| 593,577 | Hawes | Nov. 16, 1897 |
| 594,290 | Schwarz | Nov. 23, 1897 |
| 734,794 | Allen | July 28, 1903 |
| 1,167,197 | Miller | Jan. 4, 1916 |
| 1,243,679 | Allen | Oct. 23, 1917 |
| 1,305,510 | Wheeler | June 3, 1919 |
| 1,416,002 | DeVoe | May 16, 1922 |
| 1,416,003 | DeVoe | May 16, 1922 |
| 1,416,004 | DeVoe | May 16, 1922 |
| 1,428,598 | Leveque | Sept. 12, 1922 |
| 1,492,084 | Ray | Apr. 29, 1924 |
| 1,539,629 | Bazzoni | May 26, 1925 |
| 1,569,394 | Ray | Jan. 12, 1926 |
| 1,791,966 | Leveque | Feb. 10, 1931 |
| 1,944,388 | Zimmerman et al. | Jan. 23, 1934 |
| 2,053,257 | Anderson | Sept. 8, 1936 |
| 2,150,527 | Talmadge | Mar. 14, 1939 |
| 2,444,335 | Coppock | June 29, 1948 |
| 2,465,232 | Jones et al. | Mar. 22, 1949 |
| 2,559,369 | Phillips | July 3, 1951 |
| 2,736,238 | Moncrieff | Feb. 28, 1956 |
| 2,772,416 | Dorosz et al. | Dec. 4, 1956 |
| 2,899,919 | Myska | Aug. 18, 1959 |